(12) United States Patent
Shibata et al.

(10) Patent No.: US 11,761,934 B2
(45) Date of Patent: Sep. 19, 2023

(54) AUTOMATIC ANALYSIS DEVICE

(71) Applicant: SHIMADZU CORPORATION, Kyoto (JP)

(72) Inventors: Hikaru Shibata, Kyoto (JP); Akira Sasaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 459 days.

(21) Appl. No.: 16/599,274

(22) Filed: Oct. 11, 2019

(65) Prior Publication Data

US 2020/0116680 A1 Apr. 16, 2020

(30) Foreign Application Priority Data

Oct. 12, 2018 (JP) ................................ 2018-193577

(51) Int. Cl.
 *G01N 30/72* (2006.01)
 *G01N 35/00* (2006.01)
 *G01N 30/02* (2006.01)
(52) U.S. Cl.
 CPC ..... *G01N 30/724* (2013.01); *G01N 35/00732* (2013.01); *G01N 2030/027* (2013.01); *G01N 2035/00752* (2013.01)
(58) Field of Classification Search
 None
 See application file for complete search history.

(56) References Cited

U.S. PATENT DOCUMENTS 9,230,784 B2 1/2016 Morimoto
2011/0244583 A1* 10/2011 Tatsutani ......... G01N 35/00871
 436/55

(Continued)

FOREIGN PATENT DOCUMENTS

JP 2010-006535 A 1/2010
JP 2010-175395 A 8/2010

(Continued)

OTHER PUBLICATIONS

Office Action dated Feb. 1, 2022 from the Japanese Patent Office in JP Application No. 2018-193577.

(Continued)

*Primary Examiner* — Matthew D Krcha
(74) *Attorney, Agent, or Firm* — Sughrue Mion, PLLC (57) ABSTRACT

An accommodation unit includes a plurality of accommodation positions, each of the plurality of accommodation positions being capable of accommodating one of the plurality of samples. A detection unit detects identification information of each of the plurality of samples in the accommodation unit. A control unit holds the identification information of each of the plurality of samples received from the detection unit as detected identification information. The control unit is configured to receive identification information of each of a plurality of samples designated as analysis targets, and hold the received identification information as designated identification information. The control unit includes a notification means configured to output a warning before analysis is started by the analysis unit, when the control unit makes a comparison between the designated identification information and the detected identification information and determines that there is a mismatch therebetween.

10 Claims, 9 Drawing Sheets

(56) References Cited

U.S. PATENT DOCUMENTS

| | | | |
|---|---|---|---|
| 2012/0003731 A1* | 1/2012 | Kuroda | G01N 35/00732 |
| | | | 134/18 |
| 2013/0295597 A1 | 11/2013 | DeWitte et al. | |
| 2015/0219606 A1 | 8/2015 | Morimoto | |
| 2017/0168027 A1* | 6/2017 | Hanafusa | G01N 30/06 |
| 2018/0218892 A1 | 8/2018 | Yamaguchi et al. | |
| 2018/0372696 A1 | 12/2018 | Maeda | |
| 2019/0041386 A1* | 2/2019 | Yabutani | G01N 35/04 |

FOREIGN PATENT DOCUMENTS

| | | |
|---|---|---|
| JP | 2012-247392 A | 12/2012 |
| JP | 2013-541718 A | 11/2013 |
| JP | 2015-055485 A | 3/2015 |
| JP | 2015-148461 A | 8/2015 |
| WO | 2016103388 A1 | 6/2016 |
| WO | 2017094178 A1 | 6/2017 |
| WO | 2017/159359 A1 | 9/2017 |
| WO | WO-2017159359 A1 * | 9/2017 ......... G01N 33/5304 |

OTHER PUBLICATIONS

Chinese Office Action dated Dec. 29, 2022 in Chinese Application No. 201910964859.7.
Office Action dated Jun. 29, 2023 in Chinese Application No. 201910964859.7.

* cited by examiner

| WARNING ! |

IDENTIFICATION INFORMATION MISMATCH

| No. | POSITION NUMBER | DETECTED IDENTIFICATION INFORMATION | DESIGNATED IDENTIFICATION INFORMATION | TYPE OF MISMATCH |
|---|---|---|---|---|
| 1 | 2-2 | 1234567 | — | DESIGNATED IDENTIFICATION INFORMATION DOES NOT EXIST |
| 2 | — | — | 234567 | DETECTED IDENTIFICATION INFORMATION DOES NOT EXIST |
| ⋮ | | | | |

THERE IS SAMPLE FOR WHICH DETECTED IDENTIFICATION INFORMATION
DOES NOT MATCH DESIGNATED IDENTIFICATION INFORMATION
DO YOU WANT TO CONTINUE ANALYSIS?
CHOOSE DESIRED OPERATION FROM THREE CHOICES BELOW

| PAUSE | STOP ANALYSIS | START ANALYSIS |

FIG.9

AUTOMATIC ANALYSIS DEVICE

BACKGROUND OF THE INVENTION

Field of the Invention

The present invention relates to an automatic analysis device for performing qualitative and quantitative analysis of a sample, and in particular to an automatic analysis device for continuously analyzing a plurality of samples.

Description of the Background Art

When a biotic sample such as blood or urine is tested or analyzed in a clinical test in a hospital or the like, an automatic analysis device configured to continuously analyze a plurality of samples obtained from a plurality of patients is used. As such an automatic analysis device for clinical tests, for example, an LC-MS/MS, which is one type of liquid chromatograph mass spectrometer (see Japanese Patent Laying-Open No. 2015-148461), is known.

SUMMARY OF THE INVENTION

Analysis of samples in such an automatic analysis device is performed, for example, through the following procedure. First, a requester (for example, a doctor) inputs identification information of each sample designated as an analysis target into software on a computer. Then, based on designation on the software, an operator (for example, a laboratory technician) accommodates the sample accommodated in a sample container (hereinafter also referred to simply as a container) into the automatic analysis device. Then, within the automatic analysis device, a detection unit including a variety of sensors (for example, a bar code reader) reads an identifier (for example, a bar code attached to the container) of the sample (or the container), and detects the identification information. Thereafter, the automatic analysis device starts analysis (including pretreatment for analysis) of the accommodated sample.

In the automatic analysis device with such a configuration, it is important to accommodate samples designated as analysis targets without excess and deficiency, in order to correctly perform analysis. However, in a conventional automatic analysis device, when there is a mismatch between a sample designated as an analysis target and a sample accommodated in the automatic analysis device due to an erroneous operation of the operator, for example, measures against such a case are not prescribed. In such a configuration, the requester or the operator notices the mismatch between the samples only after he or she confirms an analysis result after analysis, which requires additional work and may reduce working efficiency.

The present invention has been made to solve such a problem, and an object thereof is to improve working efficiency in an automatic analysis device for continuously analyzing a plurality of samples.

An automatic analysis device in accordance with an aspect of the present invention is an automatic analysis device for continuously analyzing a plurality of samples, including an accommodation unit, a detection unit, an analysis unit, and a control unit. The accommodation unit includes a plurality of accommodation positions, each of the plurality of accommodation positions being capable of accommodating one of the plurality of samples. The detection unit is configured to detect identification information of each of the plurality of samples in the accommodation unit. The analysis unit is configured to analyze the plurality of samples after detection of the identification information of each of the plurality of samples by the detection unit. The control unit is configured to control the detection unit and the analysis unit. The detection unit is configured to output the detected identification information to the control unit. The control unit is configured to hold the identification information of each of the plurality of samples received from the detection unit as detected identification information. The control unit is further configured to receive identification information of each of a plurality of samples designated as analysis targets, and hold the received identification information as designated identification information. The control unit includes a notification means configured to output a warning before analysis is started by the analysis unit, when the control unit makes a comparison between the designated identification information and the detected identification information and determines that there is a mismatch therebetween.

According to the automatic analysis device, when there is a mismatch between the identification information of a sample accommodated in the accommodation unit and the identification information of a sample designated as an analysis target, that is, when there is a mismatch between the sample accommodated in accommodation unit and the sample designated as an analysis target, a warning is output before analysis is started. Thus, an operator can deal with the mismatch before analysis is started. This can reduce a possibility that inappropriate analysis may be performed erroneously. In addition, since this type of automatic analysis device is intended to continuously analyze several hundreds of samples, for example, it is expected that loss in working time (for example, several hours) can be significantly reduced, when compared with a case where only erroneous samples are reanalyzed after all the samples are analyzed.

Preferably, in the automatic analysis device, the analysis unit includes a pretreatment unit configured to perform pretreatment on the plurality of samples to be suitable for the analysis, before the analysis. The notification means is configured to output the warning before the pretreatment is started by the pretreatment unit.

According to the automatic analysis device, when there is a mismatch between the identification information of the sample accommodated in the accommodation unit and the identification information of the sample designated as an analysis target, the warning is output before pretreatment of the sample is started. This reduces a possibility that inappropriate pretreatment and subsequent analysis may be performed erroneously.

Preferably, in the automatic analysis device, when the identification information cannot be detected in the detection unit for a sample for which the designated identification information exists, the notification means is configured to notify the designated identification information of the sample and the warning indicating that the detected identification information of the sample does not exist.

According to the automatic analysis device, for example when a sample designated as an analysis target is not originally accommodated in the accommodation unit, or when it is difficult to detect the identification information due to the dirt of a container or the like, the operator is warned before analysis is started. Thus, the operator can deal with such an abnormality before analysis is started, and thereby working efficiency is improved.

Preferably, in the automatic analysis device, when the designated identification information does not exist for a sample for which the identification information is detected by the detection unit, the notification means is configured to notify the detected identification information of the sample and the warning indicating that the designated identification information of the sample does not exist.

According to the automatic analysis device, for example when a sample not designated as an analysis target is erroneously accommodated in the accommodation unit, the operator is warned before analysis is started. Thus, the operator can deal with such an abnormality before analysis is started, and thereby working efficiency is improved.

Preferably, in the automatic analysis device, each of the plurality of samples is accommodated in a sample container, and the identification information of each of the plurality of samples includes an identifier attached to the sample container.

According to the automatic analysis device, one or more pieces of information can be encoded into the identifier (for example, a bar code) of each sample, and the information can be read easily, achieving easy information management.

Preferably, in the automatic analysis device, each of the plurality of samples is accommodated in a sample container, the detection unit is configured to detect reflected light or transmitted light of light emitted to the sample container accommodating the sample. The detection unit is configured to detect presence or absence of the sample or a type of the sample, based on the reflected light or transmitted light.

According to the automatic analysis device, the detection unit (including a photosensor, for example) receives the reflected light or transmitted light which reflects the color, shape, size, and the like of the sample or the sample container. Based on the pattern of the reflected light or transmitted light, the detection unit can detect therefrom the presence or absence of the sample or the type of the sample.

Preferably, in the automatic analysis device, when each sample is a liquid, the detection unit is configured to detect a state of a liquid surface of the sample. The detection unit is configured to detect presence or absence of the sample or a type of the sample, based on the detected state of the liquid surface.

According to the automatic analysis device, the detection unit including a liquid surface detection sensor, for example, can measure the liquid surface of the liquid sample (for example, by measuring electrostatic capacity or electric resistance, or by using an ultrasonic wave), and automatically detect the presence or absence of the sample or the type of the sample, according to a signal based on a detection result.

Preferably, in the automatic analysis device, the notification means is configured to output the warning using at least one of display, audio output, and a physical operation of a device.

According to the automatic analysis device, the operator can receive a visually or audibly appealing warning, and thus the operator can notice a mismatch between the sample designated as an analysis target and the sample accommodated in the accommodation unit easily and quickly.

Preferably, in the automatic analysis device, the notification means is configured to present choices for determining an operation of the automatic analysis device after the warning is output. The control unit is configured to control the operation of the automatic analysis device based on a selected choice.

According to the automatic analysis device, the operator can choose an operation of the automatic analysis device after the warning is received, from limited appropriate choices, according to the content of the warning. Therefore, the operator can perform work efficiently.

Preferably, in the automatic analysis device, the operation includes three states of Start Analysis, Pause, and Stop Analysis.

According to the automatic analysis device, when a mismatch between the sample designated as an analysis target and the sample accommodated in the accommodation unit should be corrected and it is expected that the mismatch can be corrected easily (for example, such as when mismatches occur in a small number of samples), the operator can choose Pause to eliminate the mismatch, and then start analysis. On the other hand, when the mismatch should be corrected and it is expected that the mismatch cannot be corrected easily (for example, such as when mismatches occur in most of the samples), the operator stops analysis. Further, when the mismatch is extremely insignificant and it is expected that the mismatch does not have to be corrected (for example, such as when there are accommodated a small number of samples which are not designated to be analyzed but may be analyzed judging from the situation), the operator continues the operation of the automatic analysis device and starts analysis. Since the operator can choose a subsequent action easily depending on the situation as described above, the operator can perform work efficiently.

Preferably, in the automatic analysis device, the automatic analysis device is a liquid chromatograph mass spectrometer configured to ionize sample components separated by liquid chromatograph, cleave obtained ions, and perform mass spectrometry.

According to the automatic analysis device, mass spectrometry is generally performed on a large number of samples (for example, about 100 samples) at one analysis. Thus, even though it takes only a relatively short time to analyze one sample (for example, about 3 minutes), it takes a long time to analyze all the samples (for example, about 300 minutes). Therefore, by confirming whether there is a match between the sample designated as an analysis target and the sample accommodated in the accommodation unit before analysis is started, it is possible to avoid performing long-time analysis again upon occurrence of a mismatch, and thereby work can be performed efficiently.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described in detail with reference to the drawings. It should be noted that identical or corresponding parts in the drawings will be designated below by the same reference numerals, and the description thereof will not be repeated in principle.

First Embodiment

Figure 1:
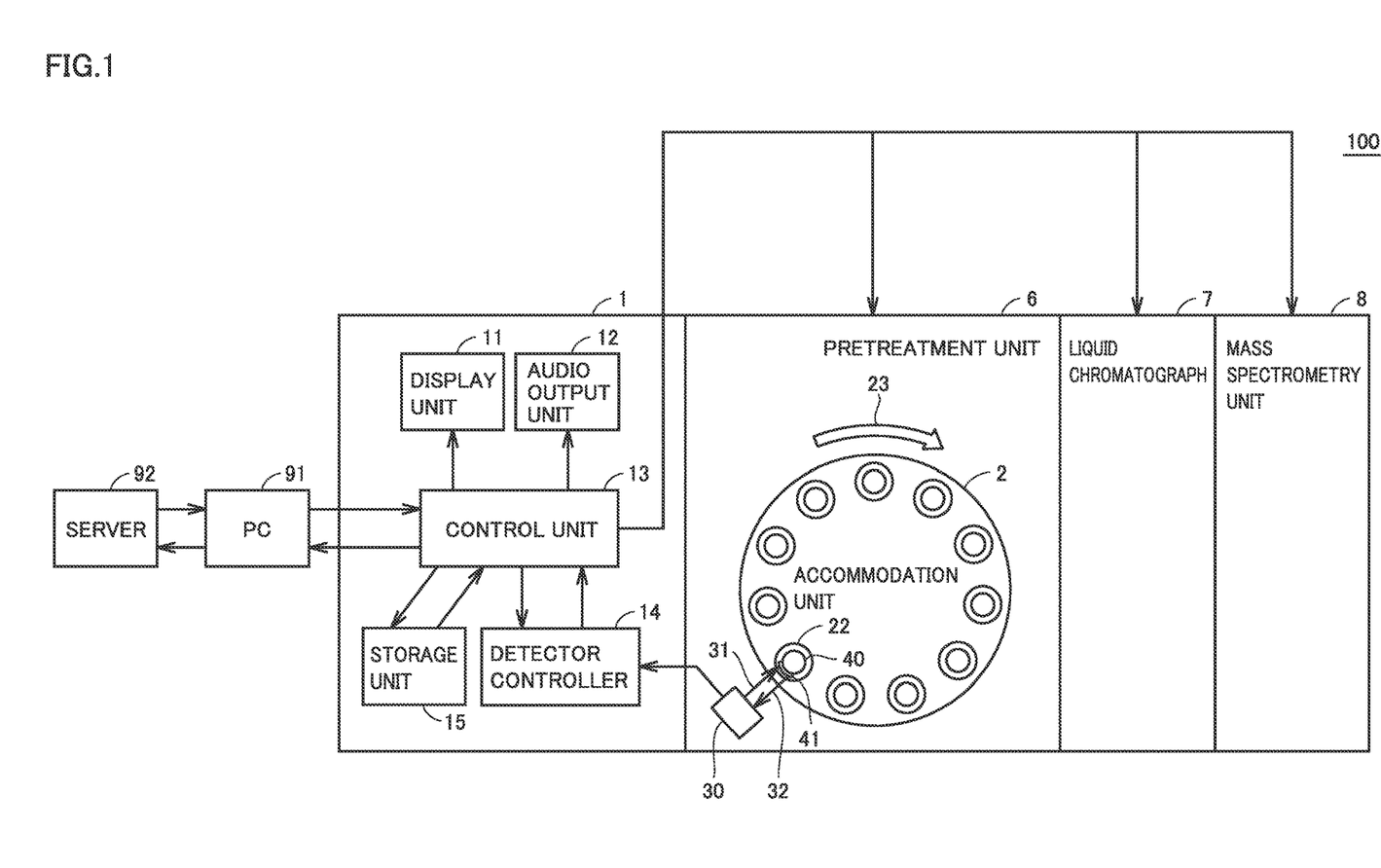
FIG. 1 is a schematic view showing a configuration of an automatic analysis device in accordance with an embodiment of the present invention.

FIG. 1 is a schematic view showing a configuration of an automatic analysis device 100 in accordance with an embodiment of the present invention. In the present embodiment, as an exemplary automatic analysis device used to continuously analyze a plurality of samples in a clinical test, an LC-MS/MS, which is one type of liquid chromatograph mass spectrometer, is shown as automatic analysis device 100.

Referring to FIG. 1, automatic analysis device 100 includes a controller 1, an accommodation unit 2, a pretreatment unit 6, a detection unit 30, a liquid chromatograph 7, and a mass spectrometry unit 8.

Accommodation unit 2 includes a plurality of accommodation positions 22. Each accommodation position 22 is configured such that an operator (for example, a laboratory technician) can accommodate therein a sample such as blood or urine accommodated in a predetermined container 40 (hereinafter also referred to as a sample container) on a one-by-one basis. Hereinafter, for ease of description, the term "sample" when used alone refers to a sample including a container. In addition, accommodation of the samples into accommodation positions 22 may be configured to be performed automatically by a machine (transportation system), and in that case, a person who supervises the machine serves as an operator.

Accommodation unit 2 is a disk-like rotating body, and is configured such that, when an operation (for example, extracting identification information described later, extracting a sample, adding a reagent) is performed on one sample, accommodation unit 2 is rotated by a predetermined angle (see an arrow 23) to allow the operation to be performed on a next sample. Accommodation unit 2 is controlled by a control unit 13 of controller 1 described later. It should be noted that the shape and movement of the accommodation unit are not limited to those of a disk-like rotating body, and the accommodation unit may be anything suitable for continuously analyzing a plurality of samples.

Detection unit 30 detects identification information of each of the samples respectively accommodated in the plurality of accommodation positions 22. The identification information of a sample is information for specifying the sample, and can include at least one of: the ID of a patient from which the sample is taken; the date and time of sample taking; the type of the sample (for example, urine, blood); and an item to be analyzed.

The identification information of each sample can be detected, for example, based on an identifier (for example, a bar code, a QR code (registered trademark), an IC chip) attached to container 40.

It should be noted that the type of each sample can also be specified based on information of reflected light or transmitted light when light is emitted to each sample. This is because the reflected light or transmitted light reflects the color, shape, size, and the like of each sample.

Figure 2:
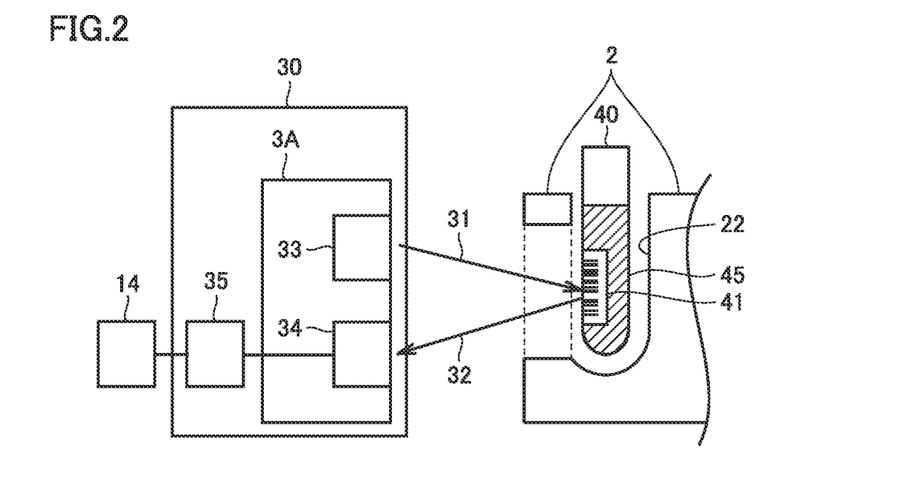
FIG. 2 is a view illustrating a manner of detecting identification information using a bar code reader.

Detection unit 30 has a detector 3 and an identification information detection unit 35 (see FIG. 2). Detector 3 detects information of a sample in a manner described later. Identification information detection unit 35 detects identification information from the information of the sample, and outputs the identification information to controller 1. Controller 1 holds the identification information of the sample received from detection unit 30 as "detected identification information", as described later. The detected identification information is identification information used by a requester or the operator to specify the sample accommodated in accommodation unit 2. It should be noted that identification information detection unit 35 may be configured to be included in controller 1 (control unit), instead of detection unit 30.

In the following, referring to FIGS. 2 to 5, examples using a bar code reader 3A (FIG. 2), a QR code reader 3B (FIG. 3), a photosensor 3C (FIG. 4), and a liquid surface detection sensor 3D (FIG. 5) are shown as typical examples of detector 3. It should be noted that, since configurations of these detectors are all well-known, the details thereof will not be described herein.

FIG. 2 is a view illustrating a manner of detecting identification information using a bar code reader. In FIG. 2, detector 3A is a bar code reader, and is configured to read a bar code 41 attached to container 40. Specifically, light 31 is emitted from a light source 33 of bar code reader 3A to bar code 41, reflected light 32 thereof is received by a light receiving element 34 of bar code reader 3A, and thereby the pattern of the bar code is read. The bar code corresponds to one embodiment of an "identifier attached to a sample container". Light receiving element 34 outputs information of the pattern of the bar code to identification information detection unit 35, and identification information detection unit 35 converts the information of the pattern of the bar code into identification information.

Figure 3:
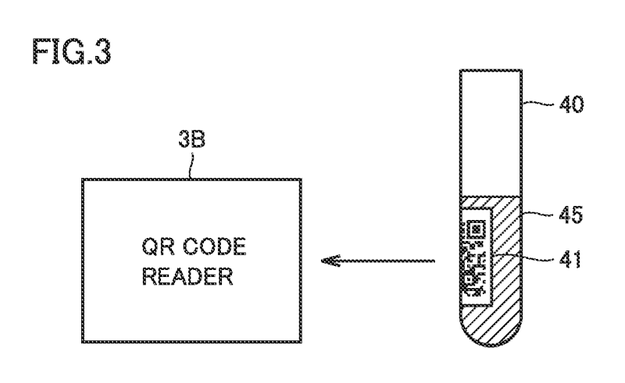
FIG. 3 is a view illustrating a manner of detecting identification information using a QR code reader.

FIG. 3 is a view illustrating a manner of detecting identification information using a QR code reader. In FIG. 3, detector 3B is a QR code reader, and is configured to read a QR code (registered trademark), which is an identifier attached to container 40.

Figure 4:
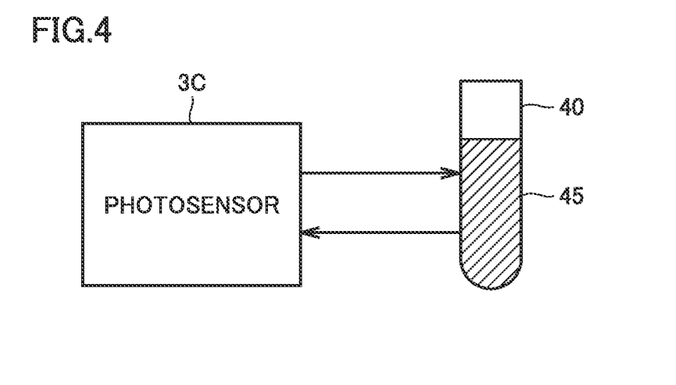
FIG. 4 is a view illustrating a manner of detecting identification information using a photosensor.

FIG. 4 is a view illustrating a manner of detecting identification information using a photosensor. In FIG. 4, detector 3C is a photosensor, and emits light to a sample and detects reflected light or transmitted light which reflects information such as the color, shape, size, and the like of a sample 45 or container 40. Detector 3 outputs a signal based on the detected reflected light or transmitted light to identification information detection unit 35. Based on the signal, identification information detection unit 35 detects the presence or absence of sample 45 or the type of sample 45. For example, control unit 13 can detect the type of sample 45 (for example, urine, blood, or the like) or the presence or absence of sample 45, from a signal based on the color of sample 45.

Figure 5:
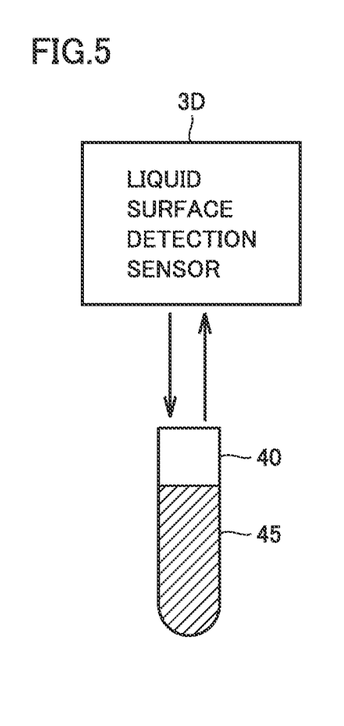
FIG. 5 is a view illustrating a manner of detecting identification information using a liquid surface detection sensor.

FIG. 5 is a view illustrating a manner of detecting identification information using a liquid surface detection sensor. In FIG. 5, detector 3D is a liquid surface detection sensor, and senses the state of a liquid surface of sample 45 by measuring electrical properties or using an ultrasonic wave or the like. For example, when detector 3D is an ultrasonic liquid surface detection sensor, detector 3D transmits an ultrasonic wave to the liquid surface of the sample, and can determine the presence or absence of the sample and the amount thereof, based on the presence or absence of a reflected wave from the liquid surface and the arrival time of the reflected wave. Detector 3D outputs a signal based on the sensed state of the liquid surface to identification information detection unit 35. Based on the signal, identification information detection unit 35 detects the presence or absence of sample 45 or the type of sample 45. For example, identification information detection unit 35 detects that the sample does not exist in container 40, from a signal indicating that the liquid surface is not sensed.

Referring to FIG. 1 again, after detection of the identification information by detection unit 30, and before analysis by liquid chromatograph 7 and mass spectrometry unit 8 described later, pretreatment unit 6 pretreats each sample to be suitable for the analysis. For example, at least one of denaturation of protein in each sample, removal of impurities, extraction of a target component, derivatization, dilution, concentration, treatment with an enzyme, and centrifugal separation is performed. Pretreatment unit 6 corresponds to one embodiment of an "analysis unit", as with liquid chromatograph 7 and mass spectrometry unit 8 described later. Thus, the term "analysis" as used in the specification of the present application also includes pretreatment by pretreatment unit 6.

Liquid chromatograph 7 has a well-known configuration including a column not shown. A sample supplied to the column of liquid chromatograph 7 is separated for each sample component in the course of passing through the column, and is successively guided to mass spectrometry unit 8 which is in a vacuum state, where mass spectrometry is performed. Thereby, different chromatograms are obtained depending on the time for which the sample component is held in the column.

Mass spectrometry unit 8 ionizes each sample component from liquid chromatograph 7, causes ions to fly in a vacuum space to which an electric field is applied to selectively screen the ions according to a mass-to-charge ratio, cleaves passed ions by CID (collision-induced dissociation), further causes the cleaved ions to fly in the vacuum space to which the electric field is applied to screen the ions produced by CID, continuously detects the number of the ions, and forms a chromatogram. Mass spectrometry unit 8 quantitatively measures the components included in the sample from the chromatogram. Further, by quickly switching a current and/or a voltage to be applied to the electric-field space, mass spectrometry unit 8 can measure a spectrum of the mass-to-charge ratio and detected intensity, check the pattern of the spectrum against a database, and identify each sample component.

Controller 1 corresponds to one embodiment of a "control unit", and controls detection unit 30, as well as pretreatment unit 6, liquid chromatograph 7, and mass spectrometry unit 8 included in the analysis unit. Controller 1 includes control unit 13, a storage unit 15, a display unit 11, an audio output unit 12, and a detector controller 14.

Display unit 11 is configured to display information to the operator using an image and text, and is a liquid crystal display, for example. Audio output unit 12 outputs information to the operator using sound, and is a speaker, for example. Display unit 11 and audio output unit 12 correspond to one embodiment of a "notification means" described later.

Storage unit 15 is configured such that it can hold information input from control unit 13, and output the held information to control unit 13. Storage unit 15 is constituted of a nonvolatile memory, for example.

Detector controller 14 is configured to output an electric signal indicating the identification information of each sample input from detection unit 30, to control unit 13. On this occasion, detector controller 14 may be configured to appropriately convert the electric signal to be suitable for transmission to control unit 13. In addition, detector controller 14 controls detection unit 30 in response to a signal from control unit 13.

Control unit 13 controls accommodation unit 2, detection unit 30, pretreatment unit 6, liquid chromatograph 7, mass spectrometry unit 8, display unit 11, audio output unit 12, storage unit 15, and detector controller 14. Control unit 13 is constituted of a CPU (Central Processing Unit) and a memory, for example.

Control unit 13 receives the above signal from detector controller 14, and then converts the signal into detected identification information and holds it. The detected identification information can include, for example, at least one of: the ID of an individual from which the sample is taken; the date and time of sample taking; the type of the sample (for example, urine, blood); and the item to be analyzed. Further, control unit 13 outputs the detected identification information to storage unit 15 if necessary, and causes storage unit 15 to store the detected identification information.

Control unit 13 is configured to receive designation of a sample to be analyzed, from the outside. In FIG. 1, control unit 13 is configured to perform wired or wireless communication with an external computer 91. Computer 91 may further be configured to perform wired or wireless communication with a server 92. The requester (for example, a doctor) who designates analysis designates a sample and an item to be analyzed, using software on a personal computer or an electronic health record. Identification information of the sample designated on the software is transmitted to computer 91 via server 92, as "designated identification information".

The designated identification information is identification information used by the requester or the operator to specify the sample designated as an analysis target.

Then, the operator who performs analysis accommodates the sample to be analyzed in accommodation unit 2 of automatic analysis device 100, based on the designated identification information on computer 91. Accommodation of the sample to be analyzed into accommodation unit 2 may be configured to be performed manually by the operator, or may be configured to be performed automatically by a machine (transportation system). In addition, computer 91 also transmits the designated identification information to control unit 13 of controller 1.

It should be noted that the manner in which control unit 13 receives the designated identification information is not limited to the above example, and for example, the designated identification information may be directly transmitted from server 92 to control unit 13. Alternatively, the designated identification information may be transmitted to control unit 13 by providing an information inputting means such as a touch panel to automatic analysis device 100, and allowing the requester or the operator to directly input the designated identification information therethrough. Further, for example, a designated identification information list in which identification information of each sample designated by the requester is listed may be read into computer 91 or control unit 13 as a file.

In order to correctly perform analysis in the automatic analysis device with such a configuration, it is important that samples designated as analysis targets are accommodated in accommodation unit 2 by the operator appropriately and without deficiency. In other words, it is important that the designated identification information of a sample matches the detected identification information of the sample (hereinafter also referred to as an "identification information match").

However, in a case as described below, a mismatch between the designated identification information and the detected identification information of a sample (hereinafter also referred to as an "identification information mismatch") occurs.

First, a description will be given of a case where an identification information mismatch occurs because the detected identification information corresponding to the designated identification information does not exist. Such a case is a case where a sample designated as an analysis target is not accommodated in accommodation unit 2, and occurs for example when the operator forgets to accommodate a sample designated by the requester to be analyzed, in accommodation unit 2.

Figure 6:
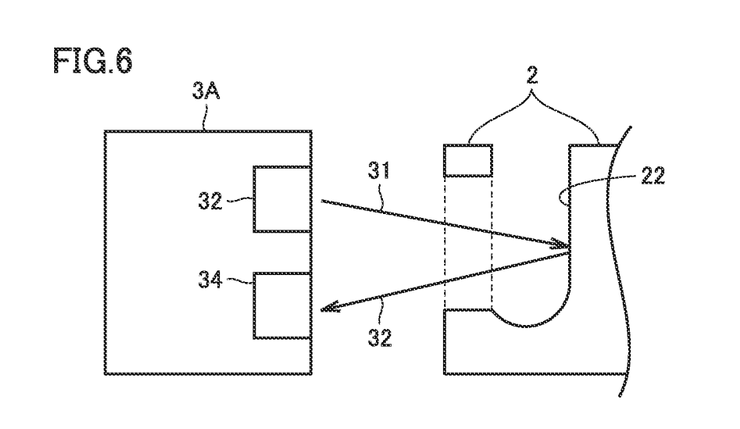
FIG. 6 is a view illustrating a state where a sample container is not accommodated in an accommodation position of an accommodation unit.

FIG. 6 is a view to be compared with FIG. 2, and is a view illustrating a state where a sample is not accommodated in accommodation position 22 of accommodation unit 2. In FIG. 6, detector 3A cannot read bar code 41, because bar code 41 attached to sample container 40 does not exist in accommodation position 22. In addition, detector 3A cannot read bar code 41 either, when the position of accommodating container 40 is accommodated incorrectly and thus it is impossible to read bar code 41, or when container 40 is accommodated correctly but bar code 41 is not attached thereto or bar code 41 is attached incorrectly, is dirty, or is distorted. In other words, there occurs a situation where the identification information of a sample cannot be detected by detection unit 30. In such a case, the detected identification information corresponding to the designated identification information does not exist. Accordingly, the designated identification information does not match the detected identification information, resulting in an identification information mismatch.

Next, a description will be given of a case where an identification information mismatch occurs because the designated identification information corresponding to the detected identification information does not exist. Such a case is a case where a sample not designated as an analysis target is accommodated in accommodation unit 2, and occurs for example when the operator erroneously accommodates a sample originally not designated to be analyzed, in accommodation unit 2. In such a case, the identification information of the erroneously accommodated sample is read by detection unit 30, and thus the designated identification information corresponding to the detected identification information does not exist. In other words, there occurs a situation where the designated identification information does not exist for one or more samples of the plurality of samples for each of which the identification information is detected by detection unit 30. In such a case, the designated identification information does not match the detected identification information, resulting in an "identification information mismatch".

In a conventional automatic analysis device, measures to be taken when such an identification information mismatch occurs are not particularly prescribed. Thus, an analysis requester or an operator may notice the identification information mismatch only after he or she reviews an analysis result after termination of analysis. In such a case, it is needed to reanalyze a sample in which the identification information mismatch occurs, after termination of analysis of all samples, which may require extra time and effort. Further, there may be a case where both the operator and the requester fail to notice the identification information mismatch and necessary analysis fails to be performed.

Accordingly, automatic analysis device 100 in accordance with the present embodiment warns the operator upon occurrence of a mismatch between the designated identification information and the detected identification information during accommodation of a sample. With such a configuration, automatic analysis device 100 allows the operator to deal with the mismatch before analysis is started, improving working efficiency.

Figure 7:
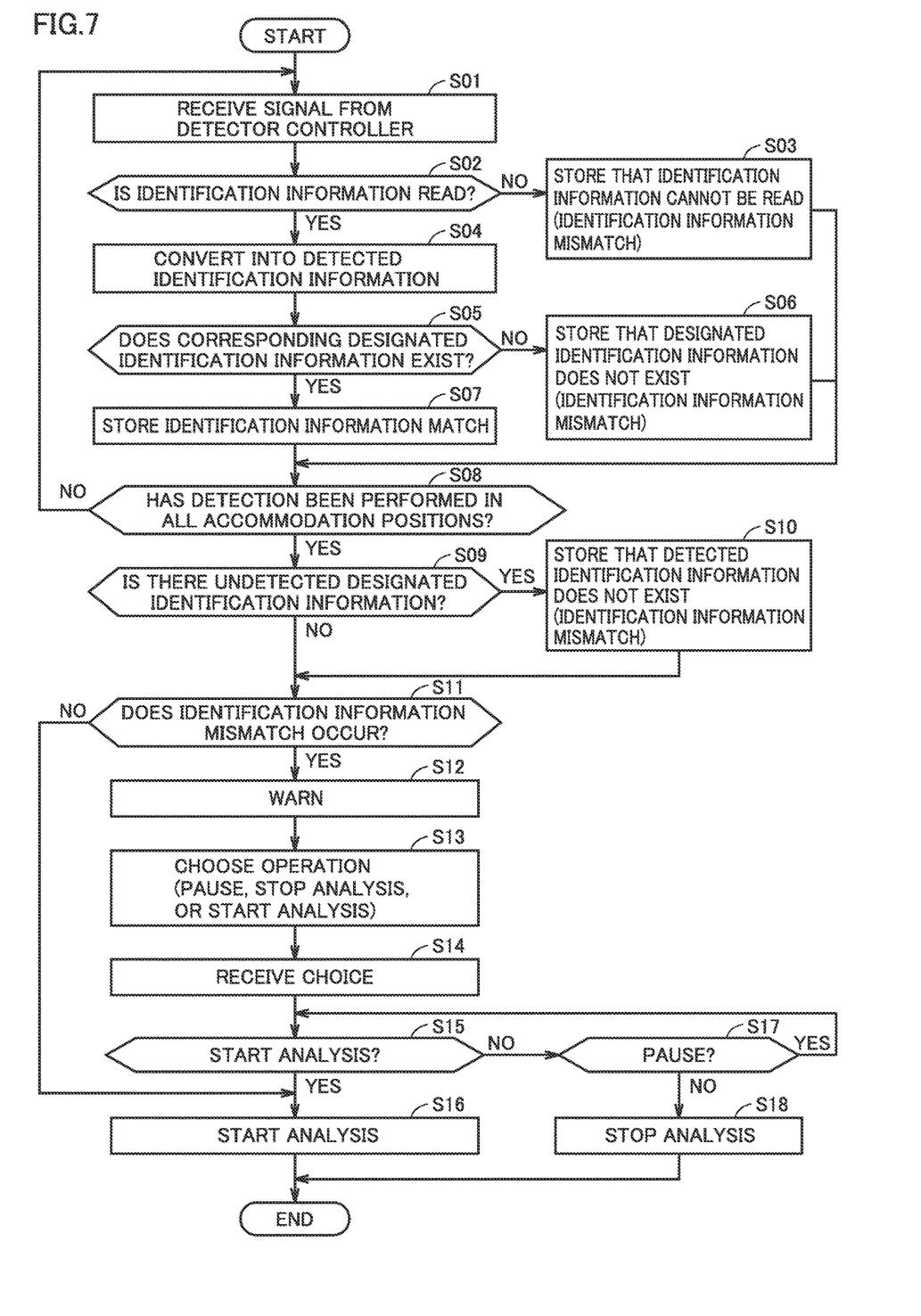
FIG. 7 is a flowchart illustrating processing of confirming the identification information performed by a control unit.

The following describes processing of confirming a match between the designated identification information and the detected identification information, in control unit 13 of controller 1 of automatic analysis device 100 in accordance with the embodiment of the present invention, with reference to FIG. 7. FIG. 7 is a flowchart illustrating processing of confirming the identification information performed by control unit 13. The processing in the flowchart of FIG. 7 is performed after accommodation of the samples into accommodation unit 2 is entirely completed.

Referring to FIG. 7, in step S01, control unit 13 of controller 1 receives a signal indicating the identification information of each sample detected by detection unit 30, from detector controller 14. Further, in step S02, control unit 13 determines whether the identification information is read appropriately from the signal.

When control unit 13 determines that the identification information is not read appropriately for some reason (for example, the bar code is dirty or peeled off) (NO in step S02), control unit 13 proceeds to step S03. In step S03, control unit 13 causes storage unit 15 to store that the identification information is not read appropriately, and that an identification information mismatch occurs as a result. Control unit 13 then proceeds to step S08.

On the other hand, when control unit 13 determines that the identification information is read appropriately (YES in step S02), control unit 13 proceeds to step S04, and causes storage unit 15 to store the read identification information as detected identification information.

Then, in step S05, control unit 13 determines whether or not designated identification information corresponding to the detected identification information exists. When a sample for which the identification information is detected is not designated by the requester as an analysis target, corresponding designated identification information does not exist (NO in step S05), and thus control unit 13 proceeds to step S06. In step S06, control unit 13 controls storage unit 15 to store the detected identification information of the sample, that the corresponding designated identification information does not exist, and that an identification information mismatch occurs as a result. Control unit 13 then proceeds to step S08.

On the other hand, when the detected sample is designated by the requester as an analysis target, the corresponding designated identification information exists (YES in step S05), and thus control unit 13 proceeds to step S07. In step S07, control unit 13 controls storage unit 15 to store an identification information match. Control unit 13 then proceeds to step S08.

In step S08, control unit 13 determines whether detection of the identification information of each sample has been performed in all accommodation positions 22 of accommodation unit 2. When there is accommodation position 22 in which the detection has not been performed (NO in step S08), control unit 13 returns to step S01 and repeats the processing for a subsequent sample.

On the other hand, when the detection of the identification information of each sample has been performed in all accommodation positions 22 of accommodation unit 2 (YES in step S08), control unit 13 proceeds to step S09. In step S09, control unit 13 determines whether or not there is a sample for which the identification information has not been detected by detection unit 30 among samples 45 designated by the requester to be analyzed, that is, whether or not there is undetected designated identification information. When there is no undetected designated identification information (NO in step S09), control unit 13 proceeds to step S11.

On the other hand, when there is undetected designated identification information (YES in step S09), control unit 13 proceeds to step S10. In step S10, control unit 13 causes storage unit 15 to store the undetected identification information of the sample, and that an identification information mismatch occurs. Then, control unit 13 proceeds to step S11.

In step S11, control unit 13 determines whether or not an identification information mismatch occurs. When no identification information mismatch occurs, that is, when all the samples designated as analysis targets are accommodated appropriately, and a sample not designated as an analysis target is not accommodated at all (NO in step S11), control unit 13 instructs to start analysis in step S16, and terminates the processing.

On the other hand, when an identification information mismatch occurs (YES in step S11), control unit 13 warns the operator that an identification information mismatch occurs. Then, in step S13, control unit 13 controls display unit 11 to provide a notification for prompting the operator to choose a subsequent operation (for example, Pause, Stop Analysis, or Start Analysis) of automatic analysis device 100.

Figure 8:
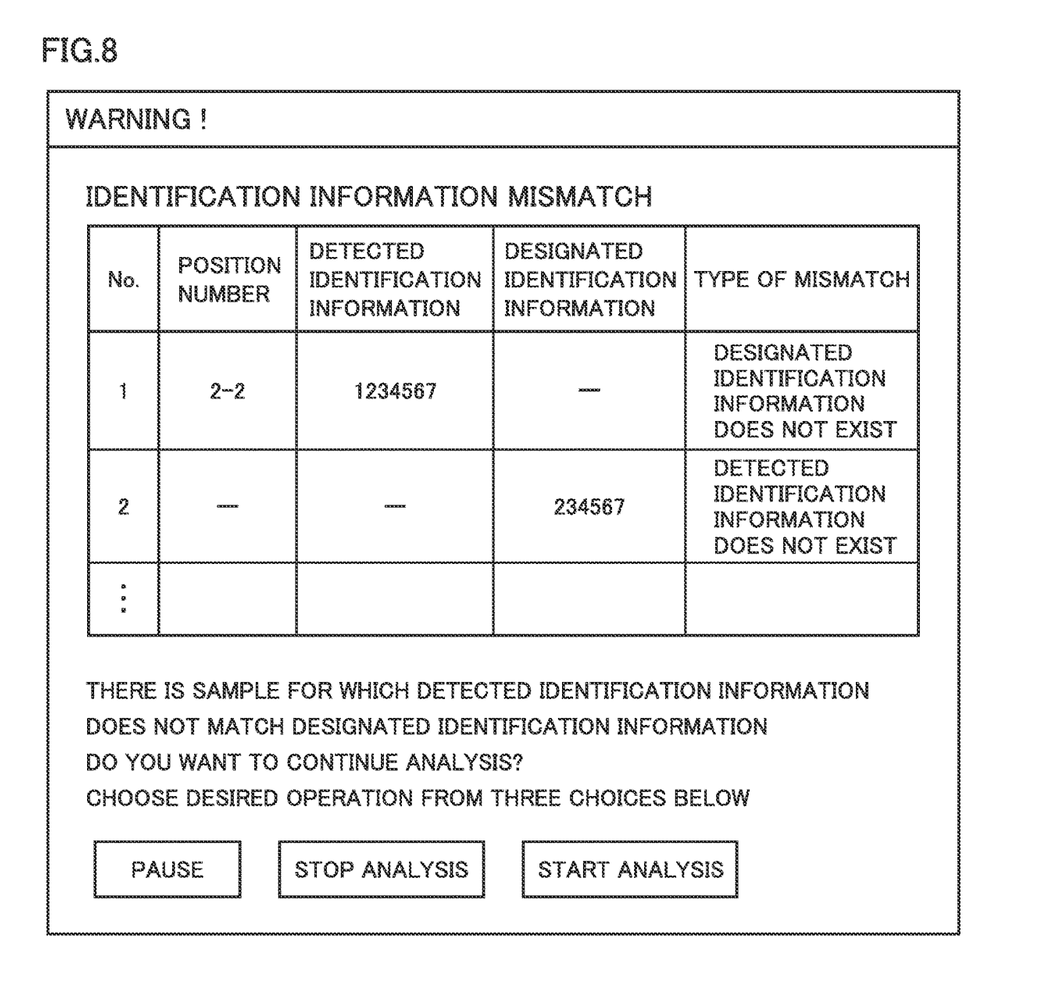
FIG. 8 is a view for illustrating screen display which warns a mismatch between detected identification information and designated identification information.

FIG. 8 is a view for illustrating screen display which warns a mismatch between the detected identification information and the designated identification information. In FIG. 8, a warning that an identification information mismatch occurs is displayed in display unit 11 of controller 1. In addition, for each of cases Nos. 1 to 3 in which a mismatch occurs, the number of accommodation position 22 accommodating container 40 in which the mismatch occurs, the detected identification information, the designated identification information, and the type of the mismatch are described. It should be noted that no information is displayed in a column for which there is no corresponding information.

In case No. 1, when the designated identification information does not exist for a sample for which the identification information is detected by detection unit 30, the detected identification information of the sample and a warning indicating that the designated identification information of the sample does not exist are notified. In case No. 2, when the identification information cannot be detected in detection unit 30 for a sample for which the designated identification information exists, the designated identification information of the sample and a warning indicating that the detected identification information of the sample does not exist are notified.

Further, in FIG. 8, choices for determining an operation of automatic analysis device 100 after the warning is output are presented, and a notification for prompting the operator to make a choice is also presented. Based on the notification, the operator can choose any of Pause the operation of automatic analysis device 100, Stop Analysis, and Start Analysis. Based on the above choice, control unit 13 controls the operation of automatic analysis device 100.

It should be noted that the warning on an identification information mismatch and the notification for prompting the operator to choose an operation may be performed simultaneously as shown in FIG. 8, or may be performed continuously in time. Further, a means for performing the warning and the notification (notification means) is not limited to screen display, and an audio notification from audio output unit 12 of controller 1 may be adopted, for example. Furthermore, the notification means may be a physical operation of each unit of automatic analysis device 100 (for example, a cover of accommodation unit 2 opens to prompt the operator to confirm a sample), for example. That is, the notification means is configured to output the warning using at least one of display, audio output, and a physical operation of the device.

In addition, an entity implementing the warning and the notification by the notification means is not limited to each unit of controller 1, and may be any part which can communicate with control unit 13, such as any of other parts of automatic analysis device 100, or computer 91, for example, Thus, control unit 13 in accordance with the present embodiment includes a notification means configured to output a warning before analysis is started by the analysis unit, when control unit 13 makes a comparison between the designated identification information and the detected identification information and determines that there is a mismatch therebetween Further, the notification means presents choices including Pause, Stop Analysis, and Start Analysis for determining an operation of automatic analysis device 100 after the warning is output. Controller 1 controls the operation of automatic analysis device 100 based on a choice.

Here, the following describes an advantage obtained when the operator can choose Pause the operation of automatic analysis device 100, Stop Analysis, or Start Analysis.

When an identification information mismatch should be corrected and correction thereof can be made easily, the operator can choose Pause and make the correction. For example, when accommodation of a sample not designated to be analyzed is detected, the operator can remove the sample. In addition, when accommodation of a sample designated to be analyzed into automatic analysis device 100 is not detected but the operator knows the place where the sample exists, the operator can obtain the sample easily and accommodate it in the accommodation unit. Thus, when correction of an identification information mismatch can be made easily, automatic analysis device 100 pauses to make the correction, and thereby analysis of a sample can be correctly performed in a short time.

Figure 9:
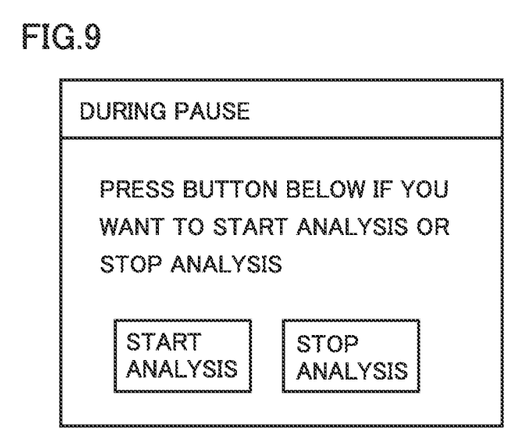
FIG. 9 is a view for illustrating screen display displayed after the automatic analysis device pauses.

It should be noted that, after Pause, it is expected to resume operation in automatic analysis device 100 and start analysis, or to stop analysis. Therefore, when Pause is chosen, a means for choosing Start Analysis or Stop Analysis may be presented, as in FIG. 9. FIG. 9 is a view for illustrating screen display displayed after automatic analysis device 100 pauses. After correcting the identification information mismatch during Pause, the analysis operator can choose to start analysis or stop analysis.

On the other hand, when an identification information mismatch should be corrected but correction thereof cannot be made easily, or when an identification information mismatch is serious enough to require stopping analysis, the operator can stop analysis. This applies to when mismatches occur in most samples and it takes time to correct them, and when it is necessary to explore root causes of such large-scale mismatches, for example.

Furthermore, when a sample mismatch is considered as a mismatch which should not always be corrected, the operator can start analysis directly by choosing Start Analysis. This applies to when it is known beforehand that a sample will be transported to automatic analysis device 100 with delay and it is acceptable to reverse the order of analysis of the sample and another sample designated to be analyzed, for example. This also applies to when accommodation unit 2 has enough room in capacity to analyze a sample which may be included in subsequent (additional) analysis designation, for example.

Referring to FIG. 7 again, after instructing the notification for prompting the operator to choose an operation in step S13, control unit 13 receives in step S14 a signal indicating the operator's choice. Then, in step S15, control unit 13 determines whether or not Start Analysis is chosen. When Start Analysis is chosen (YES in step S15), control unit 13 starts analysis in step S16, and terminates the processing.

On the other hand, when a choice other than Start Analysis is chosen (NO in step S15), control unit 13 determines in step S17 whether or not Pause is chosen. When Pause is chosen (YES in step S17), control unit 13 returns the processing to step S15. Control unit 13 repeats the loop of step S15 and step S17 until Pause is cancelled.

On the other hand, when Pause is not chosen (NO in step S17), it means that Stop Analysis is chosen, and thus control unit 13 terminates the processing without performing analysis in automatic analysis device 100.

As has been described above, when there is a mismatch between a sample designated to be analyzed and a sample actually accommodated in automatic analysis device 100, automatic analysis device 100 in accordance with the present embodiment can warn the operator before analysis is started. Accordingly, the operator can deal with the mismatch before analysis is started, and thereby working efficiency can be improved.

Although the embodiment of the present invention has been described above, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. An automatic analysis device for continuously analyzing a plurality of samples, comprising:
   an accommodation unit including a plurality of accommodation positions, each of the plurality of accommodation positions being capable of accommodating one of the plurality of samples;
   an input unit configured to input identification information of samples as analysis targets;
   a memory unit to store the identification information of samples designated as analysis targets,
   a detection unit configured to detect identification information of each of the plurality of samples in the accommodation unit by detecting the identification information on the samples within the accommodation unit; and
   a control unit, including at least one processor, configured to control the detection unit and the analysis unit,
   the detection unit being configured to output the detected identification information to the control unit,
   the control unit being configured to hold the identification information of each of the plurality of samples received from the detection unit as detected identification information,
   the control unit being further configured to receive the identification information of samples designated as analysis targets from the memory unit, and hold the received identification information of samples designated as analysis targets,
   the control unit including a notification means configured to output a warning when the control unit makes a comparison between the identification information of samples designated as analysis targets and the detected identification information and determines that there is a mismatch therebetween,
   wherein, when the identification information cannot be detected in the detection unit for a sample for which the designated identification information exists, the notification means is configured to notify the designated identification information of the sample and the warning indicating that the detected identification information of the sample does not exist.

2. The automatic analysis device according to claim 1, wherein
   the analysis unit includes a pretreatment unit configured to perform pretreatment on the plurality of samples to be suitable for the analysis, before the analysis, and
   the notification means is configured to output the warning before the pretreatment is started by the pretreatment unit.

3. The automatic analysis device according to claim 1, wherein
   each of the plurality of samples is accommodated in a sample container, and
   the identification information includes an identifier attached to the sample container.

4. The automatic analysis device according to claim 1, wherein
   each of the plurality of samples is accommodated in a sample container, and
   the detection unit is configured to detect reflected light or transmitted light of light emitted to the sample container accommodating the sample, and
   the detection unit is configured to detect presence or absence of the sample or a type of the sample, based on the reflected light or transmitted light.

5. The automatic analysis device according to claim 1, wherein
   when each sample is a liquid,
   the detection unit is configured to detect a state of a liquid surface of the sample, and
   the detection unit is configured to detect presence or absence of the sample or a type of the sample, based on the detected state of the liquid surface.

6. The automatic analysis device according to claim 1, wherein the notification means is configured to output the warning using at least one of display, audio output, and a physical operation of a device.

7. The automatic analysis device according to claim 1, wherein
   the notification means is configured to present choices for determining an operation of the automatic analysis device after the warning is output, and
   the control unit is configured to control the operation of the automatic analysis device based on a selected choice.

8. The automatic analysis device according to claim 7, wherein the operation includes three states of Start Analysis, Pause, and Stop Analysis.

9. The automatic analysis device according to claim 1, wherein the automatic analysis device is a liquid chromatograph mass spectrometer configured to ionize sample components separated by liquid chromatograph, cleave obtained ions, and perform mass spectrometry.

10. An automatic analysis device for continuously analyzing a plurality of samples, comprising:
- an accommodation unit including a plurality of accommodation positions, each of the plurality of accommodation positions being capable of accommodating one of the plurality of samples;
- an input unit configured to input identification information of samples as analysis targets;
- a memory unit to store the identification information of samples designated as analysis targets;
- a detection unit configured to detect identification information of each of the plurality of samples in the accommodation unit by detecting the identification information on the samples within the accommodation unit; and
- a control unit including at least one processor, configured to control the detection unit and the analysis unit,
- the detection unit being configured to output the detected identification information to the control unit,
- the control unit, including at least one processor, being configured to hold the identification information of each of the plurality of samples received from the detection unit as detected identification information,
- the control unit being further configured to receive the identification information of samples designated as analysis targets from the memory unit, and hold the received identification information of samples designated as analysis targets,
- the control unit including a notification means configured to output a warning when the control unit makes a comparison between the identification information of samples designated as analysis targets and the detected identification information and determines that there is a mismatch therebetween, wherein, when the designated identification information does not exist for a sample for which the identification information is detected by the detection unit, the notification means is configured to notify the detected identification information of the sample and the warning indicating that the designated identification information of the sample does not exist.

* * * * *